(12) United States Patent
Ohmura

(10) Patent No.: US 9,145,105 B2
(45) Date of Patent: Sep. 29, 2015

(54) SEATBELT BUCKLE STRUCTURE

(71) Applicant: Toyota Jidosha Kabushiki Kaisha, Toyota-shi, Aichi-ken (JP)

(72) Inventor: Yukito Ohmura, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/095,574

(22) Filed: Dec. 3, 2013

(65) Prior Publication Data
US 2014/0150221 A1 Jun. 5, 2014

(30) Foreign Application Priority Data
Dec. 4, 2012 (JP) .................................. 2012-265285

(51) Int. Cl.
*A44B 11/25* (2006.01)
*B60R 22/18* (2006.01)
*B60R 22/22* (2006.01)
*B60N 2/64* (2006.01)

(52) U.S. Cl.
CPC ................ *B60R 22/18* (2013.01); *B60N 2/646* (2013.01); *B60R 22/22* (2013.01); *A44B 11/2549* (2013.01); *B60R 2022/1806* (2013.01); *Y10T 24/44009* (2015.01); *Y10T 24/4588* (2015.01)

(58) Field of Classification Search
CPC B60R 22/18; B60R 22/22; B60R 2022/1806; A44B 11/2549; B60N 2/646; Y10T 24/4588; Y10T 24/44009
USPC ..................... 24/456, 682.1; 280/801.1, 801.2
See application file for complete search history.

(56) References Cited

U.S. PATENT DOCUMENTS

| 8,789,889 B2 * | 7/2014 | Mitsuo et al. ................. 297/482 |
| 2007/0013184 A1 | 1/2007 | Gomi et al. |
| 2013/0037674 A1 * | 2/2013 | Mitsuo et al. .............. 248/309.1 |

FOREIGN PATENT DOCUMENTS

| EP | 1688324 A1 * | 8/2006 | ............. B60R 22/18 |
| JP | H07-035203 U | 6/1995 | |
| JP | 2006-213200 A | 8/2006 | |
| JP | 2007-022227 A | 2/2007 | |
| JP | 2009137321 A | 6/2009 | |
| JP | 2010-064639 A | 3/2010 | |

* cited by examiner

*Primary Examiner* — Robert J Sandy
*Assistant Examiner* — Louis Mercado
(74) *Attorney, Agent, or Firm* — Gifford, Krass, Sprinkle, Anderson & Citkowski, P.C.

(57) ABSTRACT

A seatbelt buckle structure having: a buckle portion which a tongue plate, through which a seatbelt is inserted, is reattachable; a hollow boot portion; at whose distal end portion the buckle portion is installed; and that supports the buckle portion in an erect state by rigidity of the boot portion; a webbing portion provided at an interior of the boot portion; that connects a vehicle body and the buckle portion; that makes movement, in a vehicle vertical direction, of the boot portion possible; and that, when external force from above is inputted to the buckle portion, moves the boot portion and the buckle portion downward in the vehicle vertical direction; and an elastic member that is provided at the interior of the boot portion; that connects the boot and webbing portions; and at which elastic energy accumulates when external force from above is inputted to the buckle and boot portions.

5 Claims, 3 Drawing Sheets

FIG.2A
FIG.2B
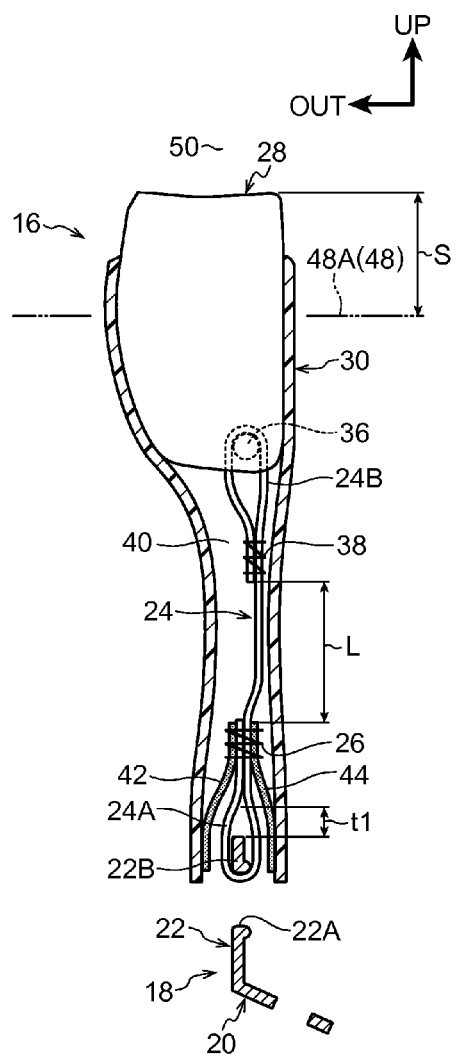
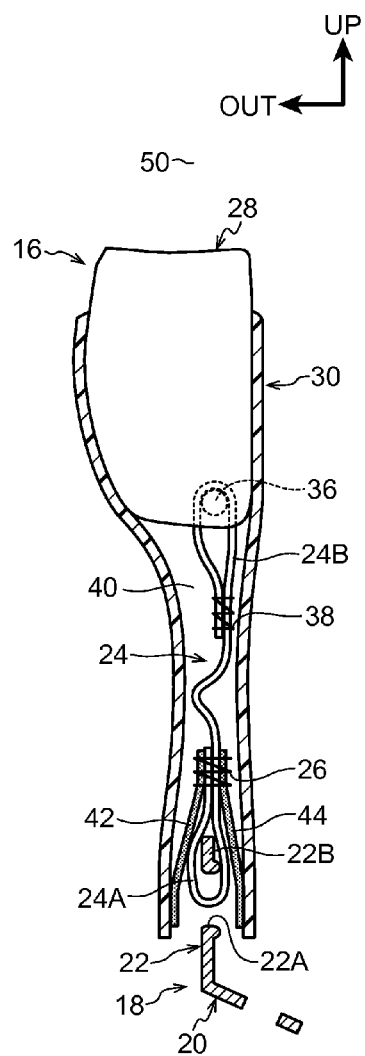

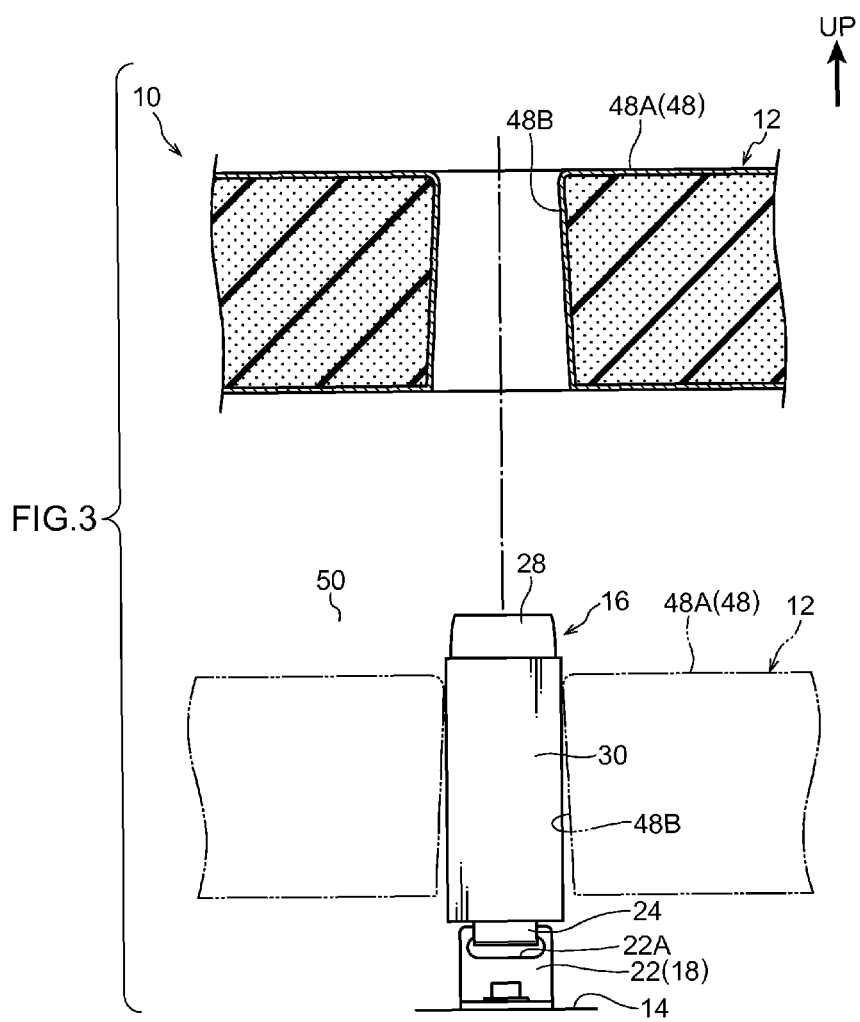

SEATBELT BUCKLE STRUCTURE

CROSS-REFERENCE TO RELATED APPLICATION

This application is based on and claims priority under 35 USC 119 from Japanese Patent Application No. 2012-265285 filed on Dec. 4, 2012, the disclosure of which is incorporated by reference herein.

BACKGROUND

1. Technical Field

The present invention relates to a seatbelt buckle structure of a vehicle.

2. Related Art

The technology of a buckle portion housing structure is disclosed in Japanese Utility Model Application Laid-Open (JP-U) No. H7-35203 for example. Concretely, the buckle portion housing structure has a buckle portion to and from which a seatbelt is attachable and detachable, a housing body portion that houses the buckle portion, and a sewn portion at which the housing body portion is sewn to a trim cover. At the vehicle cabin side of the housing body portion, there is provided an extending/contracting portion that pushes the buckle portion down by external force, and, when that external force disappears, returns the buckle portion to its original state. Due to such a structure, when external force from above is inputted to the buckle portion, the housing body portion sinks-in into the seat cushion interior, and it can be made such that the buckle portion does not project-out from the seat surface of the seat cushion.

SUMMARY

In view of the above-described circumstances, the present invention provides a seatbelt buckle structure that is highly versatile and at which, when external force from above is inputted to a buckle portion, the buckle portion moves downward in the vehicle vertical direction.

In a first aspect of the present invention, there is provided a seatbelt buckle structure that has: a buckle portion to and from which a tongue plate, through which a seatbelt is inserted, is attachable and detachable; a boot portion that is hollow; at whose distal end portion the buckle portion is installed; and that supports the buckle portion in an erect state by rigidity of the boot portion; a webbing portion that is provided at an interior of the boot portion; that connects a vehicle body and the buckle portion; that makes movement, in a vehicle vertical direction, of the boot portion possible; and that, when external force from above is inputted to the buckle portion, moves the boot portion together with the buckle portion downward in the vehicle vertical direction; and an elastic member that is provided at the interior of the boot portion; that connects the boot portion and the webbing portion; and at which elastic energy accumulates when external force from above is inputted to the buckle portion and the boot portion.

In the above-described aspect, the buckle portion, to and from which the tongue plate, through which the seatbelt is inserted, attachable and detachable, is installed at the distal end portion of the boot portion that is hollow. The buckle portion is supported in an erect state by the rigidity of the boot portion itself. The webbing portion is provided at the interior of the boot portion, and the vehicle body and the buckle portion are connected by the webbing portion, and movement of the boot portion in the vehicle vertical direction is possible.

Because the buckle portion is installed at the distal end portion of the boot portion, the buckle portion also moves in the vehicle vertical direction due to movement of the boot portion in the vehicle vertical direction. Therefore, when external force from above is inputted to the buckle portion, the boot portion can, together with the buckle portion, be moved downwardly in the vehicle vertical direction.

Further, the elastic member, that connects the boot portion and the webbing portion, is provided at the interior of the boot portion. When external force from above is inputted to the buckle portion and the boot portion, elastic energy accumulates at the elastic member. Therefore, when the state in which external force from above is inputted at the buckle portion is cancelled, the buckle portion and the boot portion can be returned by the restoring force of the elastic member at which elastic energy has accumulated. Further, because the elastic member is provided at the interior of the boot portion, the elastic member is not exposed at the vehicle cabin side. Accordingly, the elastic member is not influenced by the shape of the seat cushion and the design, the color and the like of the trim cover.

In a second aspect of the present invention, in the first aspect of the present invention, an anchor bracket may be fixed to a floor portion of the vehicle body, and the seatbelt buckle structure may have an engaging portion that is provided at the anchor bracket, and with which a loop portion, that is formed at a longitudinal direction one end portion of the webbing portion, is engaged, and that, while the buckle portion and the boot portion are in a process of moving downward in the vehicle vertical direction, is abutted by the loop portion and restricts downward movement at the loop portion.

In the above-described structure, the anchor bracket is fixed to the floor portion of the vehicle body. The engaging portion is provided at this anchor bracket. The loop portion, that is formed at one end portion in the longitudinal direction of the webbing portion, is engaged with this engaging portion. In the process in which the buckle portion and the boot portion move downwardly in the vehicle vertical direction, the loop portion abuts the engaging portion, and downward movement in the vehicle vertical direction is restricted.

The boot portion and the webbing portion are connected by the elastic member. In the process in which the buckle portion and the boot portion move downwardly in the vehicle vertical direction, at the webbing portion, downward movement of the loop portion is restricted. Therefore, the separated distance from the boot portion becomes large, and there becomes a state in which elastic energy accumulates at the elastic member. Therefore, when the state in which external force from above is inputted at the buckle portion is cancelled, the buckle portion and the boot portion can be returned by the restoring force of the elastic member at which elastic energy has accumulated.

In a third aspect of the present invention, in the first aspect of the present invention, the elastic member may be a rubber member that is shaped as a long plate, and a longitudinal direction one end portion of the rubber member may be mounted to a longitudinal direction one end portion of the webbing portion, and a longitudinal direction other end portion of the rubber member may be mounted to a vehicle vertical direction lower end side of the boot portion.

In the above-described structure, the elastic member is a rubber member that is long-plate-shaped. One end portion in the longitudinal direction of this rubber member is mounted to the webbing portion, and the other end portion in the longitudinal direction of the rubber member is mounted to the boot portion. Therefore, when the buckle portion and the boot portion move downwardly in the vehicle vertical direction, elastic energy accumulates at the rubber member due to relative movement of the webbing portion and the boot portion.

In a fourth aspect of the present invention, in the third aspect of the present invention, the loop portion is provided between a pair of rubber members.

In the above-described structure, the loop portion is provided between a pair of rubber members. Therefore, at the time when the boot portion moves along the vehicle vertical direction, the boot portion can be moved smoothly along the axis of movement thereof.

In a fifth aspect of the present invention, in the third aspect of the present invention, the longitudinal direction one end portion of the rubber member and the longitudinal direction one end portion of the webbing portion are sewn together.

Generally, at one end portion in the longitudinal direction of the webbing portion, the webbing portion is sewn by sewing thread or the like in a state of being overlapped on itself. Therefore, in accordance with the above-described structure, due to the longitudinal direction one end portion of the rubber member being sewn together with the longitudinal direction one end portion of the webbing portion, the longitudinal direction one end portion of the rubber member can be sewn simultaneously at the time when the longitudinal direction one end portion of the webbing portion is sewn.

In a sixth aspect of the present invention, in the fourth aspect of the present invention, the longitudinal direction one end portions of the rubber members and the longitudinal direction one end portion of the webbing portion are sewn together.

In accordance with the above-described structure, due to the longitudinal direction one end portions of the rubber members being sewn together with the longitudinal direction one end portion of the webbing portion, the longitudinal direction one end portions of the rubber members can be sewn simultaneously at the time when the longitudinal direction one end portion of the webbing portion is sewn.

In a seventh aspect of the present invention, in the second aspect of the present invention, the elastic member may be a rubber member that is shaped as a long plate, and a longitudinal direction one end portion of the rubber member may be mounted to a longitudinal direction one end portion of the webbing portion, and a longitudinal direction other end portion of the rubber member may be mounted to a vehicle vertical direction lower end side of the boot portion.

In the above-described structure, the elastic member is a rubber member that is long-plate-shaped. One end portion in the longitudinal direction of this rubber member is mounted to the webbing portion, and the other end portion in the longitudinal direction of the rubber member is mounted to the boot portion. Therefore, when the buckle portion and the boot portion move downwardly in the vehicle vertical direction, elastic energy accumulates at the rubber member due to relative movement of the webbing portion and the boot portion.

In an eighth aspect of the present invention, in the seventh aspect of the present invention, the loop portion is provided between a pair of rubber members.

In the above-described structure, the loop portion is provided between a pair of rubber members. Therefore, at the time when the boot portion moves along the vehicle vertical direction, the boot portion can be moved smoothly along the axis of movement thereof.

In a ninth aspect of the present invention, in the seventh aspect of the present invention, the longitudinal direction one end portion of the rubber member and the longitudinal direction one end portion of the webbing portion are sewn together.

In accordance with the above-described structure, due to the longitudinal direction one end portion of the rubber member being sewn together with the longitudinal direction one end portion of the webbing portion, the longitudinal direction one end portion of the rubber member can be sewn simultaneously at the time when the longitudinal direction one end portion of the webbing portion is sewn.

In a tenth aspect of the present invention, in the eighth aspect of the present invention, the longitudinal direction one end portions of the rubber members and the longitudinal direction one end portion of the webbing portion are sewn together.

In accordance with the above-described structure, due to the longitudinal direction one end portions of the rubber members being sewn together with the longitudinal direction one end portion of the webbing portion, the longitudinal direction one end portions of the rubber members can be sewn simultaneously at the time when the longitudinal direction one end portion of the webbing portion is sewn.

As described above, the first aspect of the present invention has the excellent effects that, when external force from above is inputted to the buckle portion, the buckle portion moves downward in the vehicle vertical direction, and that great versatility can be achieved.

The second aspect of the present invention has the excellent effect that, when the buckle portion moves downward in the vehicle vertical direction, elastic energy can accumulate at the elastic member.

The third aspect of the present invention has the excellent effect that elastic energy can accumulate at the rubber member due to relative movement between the webbing portion and the boot portion.

The fourth aspect of the present invention has the excellent effect that rattling at the time when the boot portion moves can be reduced.

The fifth aspect of the present invention has the excellent effect that improved work efficiency can be devised.

The sixth aspect of the present invention has the excellent effect that improved work efficiency can be devised.

The seventh aspect of the present invention has the excellent effect that elastic energy can accumulate at the rubber member due to relative movement between the webbing portion and the boot portion.

The eight aspect of the present invention has the excellent effect that rattling at the time when the boot portion moves can be reduced.

The ninth aspect of the present invention has the excellent effect that improved work efficiency can be devised.

The tenth aspect of the present invention has the excellent effect that improved work efficiency can be devised.

BRIEF DESCRIPTION OF THE DRAWINGS

An exemplary embodiment of the present invention will be described in detail based on the following figures, wherein:

FIG. 2A is a cross-sectional view showing the state cut along line 2A-2A of FIG. 1;

FIG. 2B is a cross-sectional view showing a state in which the buckle device has moved downward; and FIG. 3 is a cross-sectional view for explaining the process of mounting a seat cushion to a floor panel.

DETAILED DESCRIPTION

Figure 1:
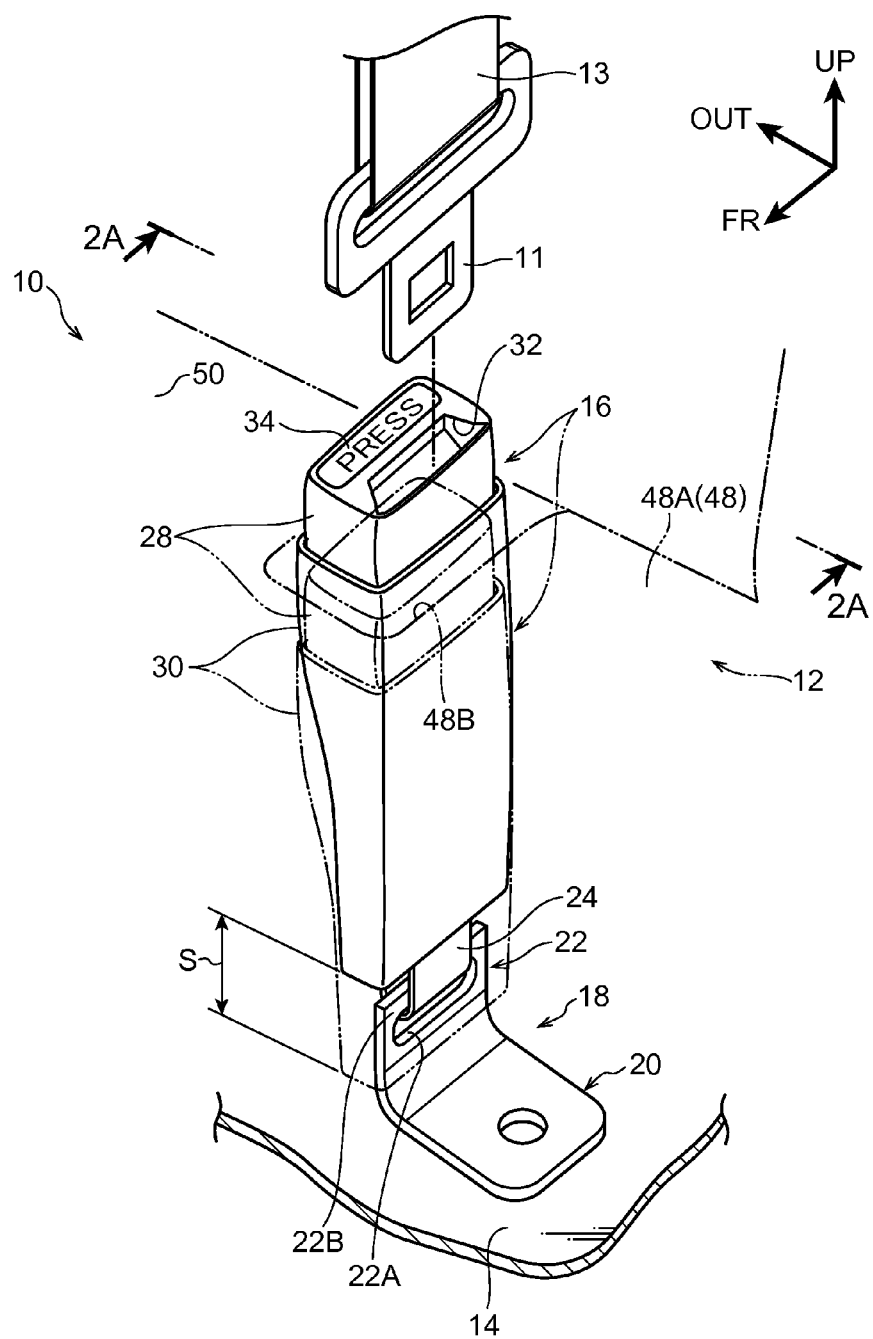
FIG. 1 is a perspective view showing a buckle device to which a seatbelt buckle structure relating to an embodiment of the present invention is applied.

A seatbelt buckle structure relating to an embodiment of the present invention is described by using the drawings. Note that arrow FR that is shown appropriately in these drawings indicates the vehicle front side, arrow UP indicates the vehicle upper side, and arrow OUT indicates the vehicle transverse direction outer side.

(Structure of Seatbelt Buckle Structure)

First, the structure of the seatbelt buckle structure is described. As shown in FIG. 1, the seatbelt buckle structure relating to the present embodiment is applied to, for example, a rear seat 12 of a vehicle 10 that serves as a vehicle body. A seat cushion 48 that structures the rear sear 12 is mounted to the top surface of a rear floor pan 14 that serves as a floor portion of the vehicle body. An anchor bracket 18 for mounting a buckle device 16, that is structured by a buckle portion 28 and a boot portion 30 that are described later, to the rear floor pan 14 is fixed to the top surface of the rear floor pan 14.

The anchor bracket 18 is formed by a plate member made of metal being bent in a substantially L-shape as seen from the vehicle front. A fastening portion 20, that is set sideways along the vehicle transverse direction and is fastened (fixed) to the rear floor pan 14 by an unillustrated bolt and nut, is provided at one side of the anchor bracket 18.

Further, a connecting portion 22, that is set erect toward the vehicle vertical direction upper side and in which a through-hole 22A is formed along the vehicle longitudinal direction, is provided at the other side of the anchor bracket 18. One end side in the longitudinal direction of a webbing 24, that is formed in the shape of a belt of chemical fibers or the like, is inserted-through the through-hole 22A.

As shown in FIG. 2A, at one end portion in the longitudinal direction (the lower end portion) of the webbing 24, the webbing 24 is trained around an upper portion (engaging portion) 22B of the connecting portion 22 in a state of being inserted-through the through-hole 22A of the connecting portion 22. Therefore, a loop portion 24A is formed at the lower end portion of the webbing 24, and this loop portion 24A is trained around the upper portion 22B of the connecting portion 22. The loop portion 24A is formed by the webbing 24 being overlapped on itself and sewn together by sewing thread or staples or the like at a sewn portion 26 of the webbing 24. Due thereto, the lower end portion of the webbing 24 is connected to the anchor bracket 18.

Further, the other end portion in the longitudinal direction (the upper end portion) of the webbing 24 is engaged with the lower portion of the buckle portion 28 that is formed in a rectangular tube shape. The boot portion 30, that is made of resin and is formed in a rectangular tube shape, is provided at the outer side of the buckle portion 28. Concretely, the buckle portion 28 is installed at the upper portion of the boot portion 30. Due thereto, the buckle portion 28 and the boot portion 30 are made integral, and the erect state of the buckle portion 28 is maintained by the rigidity of the boot portion 30 itself.

Note that, for convenience of explanation, description is given hereinafter with the upper side in the drawings, in the state in which the boot portion 30 and the buckle portion 28 are erect, being the vehicle vertical direction upper side and the lower side in the drawings being the vehicle vertical direction lower side, as shown in FIG. 1.

As shown in FIG. 1, the seat cushion 48 is provided at the rear seat 12, and a cut-out portion 48B, that forms a rectangular shape in plan view, is formed in the vehicle longitudinal direction rear portion of the seat cushion 48. The buckle portion 28 can be exposed to a vehicle cabin 50 side through this cut-out portion 48B.

Further, an opening portion 32 is provided in the buckle portion 28 along the vehicle vertical direction. A tongue plate 11 is inserted-in through this opening portion 32 and can be anchored at the buckle portion 28. The passenger who is seated in the rear seat 12 is restrained by a seatbelt 13 in a state in which the tongue plate 11 is anchored at the buckle portion 28.

A release button 34 is provided at the buckle portion 28 so as to be movable along the vehicle vertical direction, at the outer side of the passenger who is restrained by the seatbelt 13. Due to this release button 34 being pushed downward, the state in which the tongue plate 11 is anchored at the buckle portion 28 is cancelled, and the state in which the passenger, who was restrained by the seatbelt 13, is restrained by the seatbelt 13, is cancelled.

As shown in FIG. 2A, an engagement bar 36 spans the interior of the buckle portion 28 along the vehicle longitudinal direction. The upper end portion of the webbing 24 is trained around this engagement bar 36. Concretely, a loop portion 24B is formed at the upper end portion of the webbing 24, and this loop portion 24B is trained around the engagement bar 36. The loop portion 24B is formed by the webbing 24 being overlapped on itself and sewn together at a sewn portion 38 of the webbing 24. Due thereto, the upper end portion of the webbing 24 is connected to the buckle portion 28. Namely, the buckle portion 28 and the anchor bracket 18 are connected by the webbing 24 at the interior of a hollow portion 40 of the boot portion 30.

Here, rubber members 42, 44, that serve as a pair of long-plate-shaped elastic members, are provided at the interior of the hollow portion 40 of the boot portion 30 with the loop portion 24A of the webbing 24 disposed therebetween. One end portions in the longitudinal direction (the lower end portions) of the rubber members 42, 44 are respectively sewn to the lower end portion of the boot portion 30, and the other end portions in the longitudinal direction (the upper end portions) of the rubber members 42, 44 are respectively sewn together with the webbing 24 at the sewn portion 26 of the webbing 24.

Further, as shown in FIG. 1 and FIG. 2A, at the lower portion side of the boot portion 30, the thickness along the vehicle transverse direction is thinner than at the upper portion side of the boot portion 30. However, the hollow portion 40 of the boot portion 30 is set to be a size such that the connecting portion 22 of the anchor plate 18 can be inserted therein. Due thereto, movement of the buckle device 16 downward in the vehicle vertical direction is possible.

On the other hand, the loop portion 24A, that is provided at the lower end portion of the webbing 24, is trained around the upper portion 22B of the connecting portion 22 at the anchor bracket 18, and a gap t1 is provided between the upper portion of the loop portion 24A and the upper portion 22B of the connecting portion 22. This gap t1 is set so as to be smaller than a stroke S (see FIG. 1) of the buckle device 16 (t1<S). Further, a length L of the webbing 24 between the sewn portion 26 and the sewn portion 38 is set to be larger than the stroke S of the buckle device 16 (S<L). Namely, the length L of the webbing 24 is set so as to not impede the movement of the buckle device 16.

Note that, as shown in FIG. 2A, in the state in which the lower portion of the loop portion 24A is abutting the upper portion 22B of the connecting portion 22, movement of the buckle device 16 upward in the vehicle vertical direction is restricted. In this state, the upper portion of the buckle portion 28 is set so as to be exposed from a seat surface 48A of the seat cushion 48 of the rear seat 12.

Further, the stroke S of the buckle device 16 is set such that, in the state in which the buckle device 16 has moved downward in the vehicle vertical direction, the buckle device 16 withdraws from the seat surface 48A of the seat cushion 48. Here, it is preferable that the top surface of the buckle portion 28 moves further downward than the seat surface 48A of the seat cushion 48, but "withdraw" here means that the buckle device 16 moves downward. Namely, the stroke S of the buckle device 16 can be set freely per each vehicle type. Therefore, the top surface of the buckle portion 28 does not necessarily have to move further downward than the seat surface 48A of the seat cushion 48.

(Operation/Effects of Seatbelt Buckle Structure)

The operation/effects of the seatbelt buckle structure relating to the present embodiment are described next.

As shown in FIG. 1, in the present embodiment, the buckle device 16 is made to be movable along the vehicle vertical direction. Here, as shown in FIG. 2A, the loop portion 24A is provided at the lower end portion of the webbing 24, and this loop portion 24A is trained around the upper portion 22B of the connecting portion 22 at the anchor bracket 18. Further, the gap t1, that is provided between the upper portion of the loop portion 24A and the upper portion 22B of the connecting portion 22 at the anchor bracket 18, is set to be smaller than the stroke S of the buckle device 16 (t1<S). Moreover, the lower end portions of the rubber members 42, 44 are respectively sewn to the lower end portion of the boot portion 30, and the upper end portions of the rubber members 42, 44 are sewn together with the webbing 24 at the sewn portion 26 of the webbing 24.

Therefore, as shown in FIG. 2B, in the process of the buckle device 16 withdrawing from the seat surface 48A of the seat cushion 48 (the buckle device 16 moving toward the lower side in the vehicle vertical direction), the upper portion of the loop portion 24A abuts the upper portion 22B of the connecting portion 22 at the anchor bracket 18. Due thereto, downward movement of the loop portion 24A is restricted. When, from this state, the buckle device 16 is moved further downward, the sewn portion 26 approaches the sewn portion 38. Due thereto, the central portion of the webbing 24, that is positioned between the sewn portion 26 and the sewn portion 38, goes slack. Together therewith, the rubber members 42, 44, that are sewn to the lower end portion of the boot portion 30, are extended, elastic energy accumulates at the rubber members 42, 44, and, as shown by the imaginary lines in FIG. 1, the buckle device 16 withdraws from the seat surface 48A of the seat cushion 48.

Accordingly, when external force from above is inputted to the buckle portion 28 that is fit-in the upper portion of the boot portion 30, the buckle device 16 moves downwardly in the vehicle vertical direction, and withdraws from the seat surface 48A of the seat cushion 48 of the rear seat 12. Therefore, if a passenger mistakenly attempts to sit on the buckle portion 28, the resistance that the passenger receives from the buckle portion 28 is lessened.

Further, as shown in FIG. 2A, the boot portion 30 and the webbing 24 are connected by the rubber members 42, 44. Therefore, in the state in which the buckle device 16 has withdrawn from the seat surface 48A of the seat cushion 48 of the rear seat 12, at the webbing 24, downward movement of the loop portion 24A is restricted. Therefore, the distance by which the lower end portion of the boot portion 30 (the lower end portions of the rubber members 42, 44) and the sewn portion 26 (the upper end portions of the rubber members 42, 44) are separated becomes larger. Due thereto, there becomes a state in which elastic energy accumulates at the rubber members 42, 44. Note that, when the state in which external force from above is inputted at the buckle portion 28 is cancelled, the buckle device 16 can be returned by the restoring force of the rubber members 42, 44 at which elastic energy has accumulated.

Here, because the rubber members 42, 44 are provided within the hollow portion 40 of the boot portion 30, the rubber members 42, 44 are not exposed at the vehicle cabin 50 side. Accordingly, the rubber members 42, 44 are not influenced by the shape of the seat cushion 48 and the design, the color and the like of the trim cover (not illustrated). Namely, great versatility can be obtained with the buckle device 16 relating to the present embodiment.

Further, the buckle device 16 is connected to the anchor bracket 18 via the webbing 24. Because the webbing 24 is flexible as compared with a plate that is made of metal or resin, the resistance that a passenger receives from the buckle portion 28 is lessened. Further, when the passenger starts to put on the seatbelt 13 (see FIG. 1), the buckle device 16 can be disposed at a position at which it is easy to put on the seatbelt 13, and the ability to put the seatbelt 13 on improves.

As shown in FIG. 3, the anchor bracket 18 is fixed to the top surface of the rear floor pan 14, and the buckle device 16 is connected to this anchor bracket 18. On the other hand, the cut-out portion 48B is formed in the seat cushion 48, and, at the time of mounting the seat cushion 48 to the rear floor pan 14, the buckle device 16 is inserted into the cut-out portion 48B, and the buckle portion 28 is exposed at the cabin interior 50 side through this cut-out portion 48B. In this state, the buckle device 16 is supported by the inner peripheral surfaces of the cut-out portion 48B and can stand upright. In this way, in the present embodiment, because the buckle device 16 is provided in a state of being independent from the seat cushion 48, the workability at the time of mounting the seat cushion 48 to the rear floor pan 14 is good, and further, application to existing vehicle types also is possible.

Further, as shown in FIG. 2A, in the present embodiment, the rubber members 42, 44 are provided with the webbing 24 disposed therebetween. Therefore, when the buckle device 16 moves along the vehicle vertical direction, the buckle device 16 can be moved smoothly along the axis of movement thereof, and rattling at the time when the buckle device 16 moves can be reduced. However, the rubber members 42, 44 do not necessarily have to be a pair.

Further, in the present embodiment, the upper end portions of the rubber members 42, 44 are respectively sewn together with the webbing 24 at the sewn portion 26 of the webbing 24. Therefore, at the time of sewing the lower end portion of the webbing 24, the upper end portions of the rubber members 42, 44 can be sewn simultaneously. Therefore, the work can be made more efficient and can be handled inexpensively.

Moreover, in the present embodiment, the buckle device 16 and the anchor bracket 18 are connected by the webbing 24 that is made of chemical fibers or the like, and the webbing 24 and the boot portion 30, that is made of resin and that structures a part of the buckle device 16, are connected by the rubber members 42, 44. Namely, because metal parts are not included among these members, there is no sticking of lubricant to other parts and no concern of abnormal noise of sliding.

Note that, in the present embodiment, description is given by using the rubber members 42, 44 as the elastic members. Using the rubber members 42, 44 enables lighter weight and less expensive handling than springs, but springs, of course, may also be used.

Further, as shown in FIG. 1, the present embodiment describes an example in which the buckle device 16 is made suitable for the rear seat 12, but the buckle device 16 may be applied to a front bench seat. Note that the shape and the like of the buckle device 16 can be changed appropriately in accordance with the vehicle type.

An embodiment of the present invention has been described above. However, the present invention is not limited to the above, and, of course, can be embodied by being modified in various ways other than those described above within a scope that does not deviate from the gist of the present invention.

What is claimed is:

1. A seatbelt buckle structure comprising:
a buckle portion to and from which a tongue plate, through which a seatbelt is inserted, is attachable and detachable;
a boot portion that is hollow; at whose distal end portion the buckle portion is installed; and that supports the buckle portion in an erect state by rigidity of the boot portion;
a webbing portion that is provided at an interior of the boot portion; that connects a vehicle body and the buckle portion; that makes movement, in a vehicle vertical direction, of the boot portion possible; and that, when external force from above is inputted to the buckle portion, moves the boot portion together with the buckle portion downward in the vehicle vertical direction; and
a rubber member that is provided at the interior of the boot portion; that connects the boot portion and the webbing portion; and at which elastic energy accumulates when external force from above is inputted to the buckle portion and the boot portion, the rubber member is shaped as a long plate, and a longitudinal direction one end portion of the rubber member is mounted to a longitudinal direction one end portion of the webbing portion, and a longitudinal direction other end portion of the rubber member is mounted to a vehicle vertical direction lower end side of the boot portion.

2. The seatbelt buckle structure of claim 1, wherein:
an anchor bracket is fixed to a floor portion of the vehicle body, and
the seatbelt buckle structure has an engaging portion that is provided at the anchor bracket, and with which a loop portion, that is formed at a longitudinal direction one end portion of the webbing portion, is engaged, and that, while the buckle portion and the boot portion are in a process of moving downward in the vehicle vertical direction, is abutted by the loop portion and restricts downward movement at the loop portion.

3. The seatbelt buckle structure of claim 1, wherein a loop portion is provided between a pair of rubber members.

4. The seatbelt buckle structure of claim 3, wherein the longitudinal direction one end portions of the rubber members and the longitudinal direction one end portion of the webbing portion are sewn together.

5. The seatbelt buckle structure of claim 1, wherein the longitudinal direction one end portion of the rubber member and the longitudinal direction one end portion of the webbing portion are sewn together.

* * * * *